Jan. 2, 1962     F. T. ROBERTS ET AL     3,015,599
METHOD OF MAKING REINFORCED CORRUGATED HOSE
Filed April 16, 1958     4 Sheets-Sheet 1
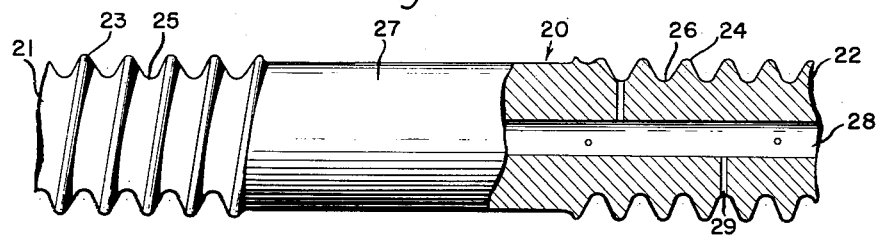
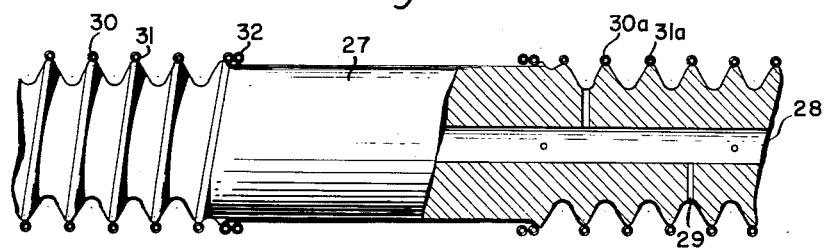
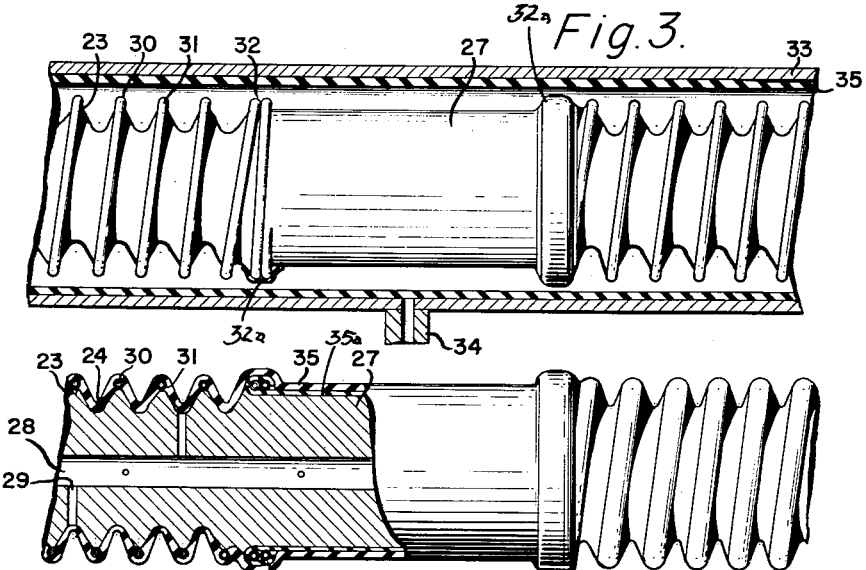
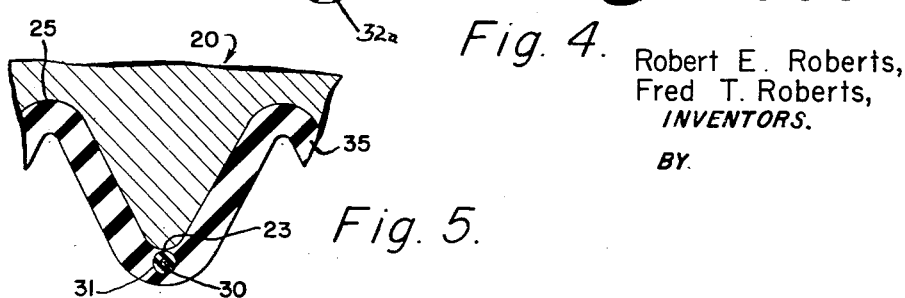
Robert E. Roberts,
Fred T. Roberts,
INVENTORS.
BY
ATTORNEY.

Jan. 2, 1962   F. T. ROBERTS ET AL   3,015,599
METHOD OF MAKING REINFORCED CORRUGATED HOSE
Filed April 16, 1958   4 Sheets-Sheet 2

Robert E. Roberts,
Fred T. Roberts
INVENTORS.

BY.

ATTORNEY.

Jan. 2, 1962  F. T. ROBERTS ET AL  3,015,599
METHOD OF MAKING REINFORCED CORRUGATED HOSE
Filed April 16, 1958  4 Sheets-Sheet 3
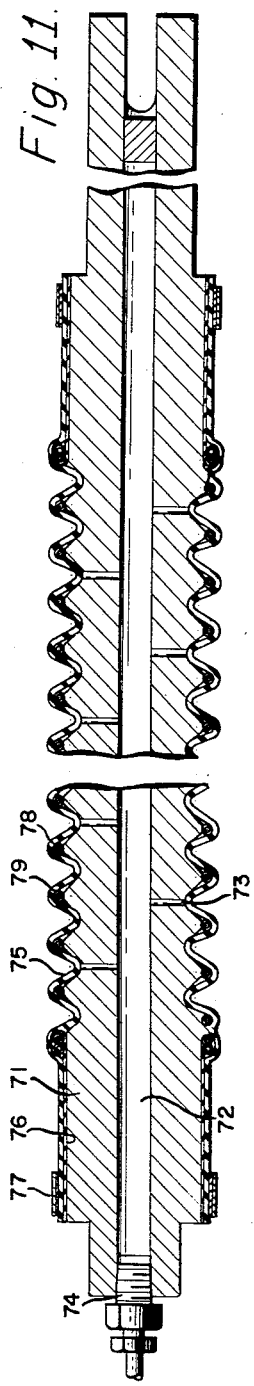
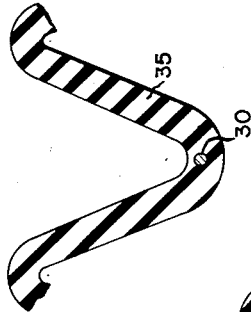
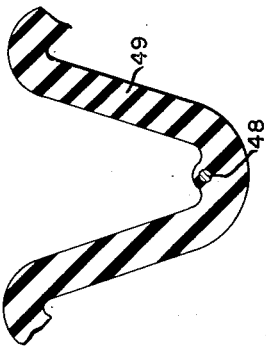
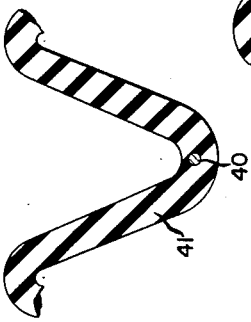
Robert E. Roberts,
Fred T. Roberts,
INVENTORS.
BY.
ATTORNEY.

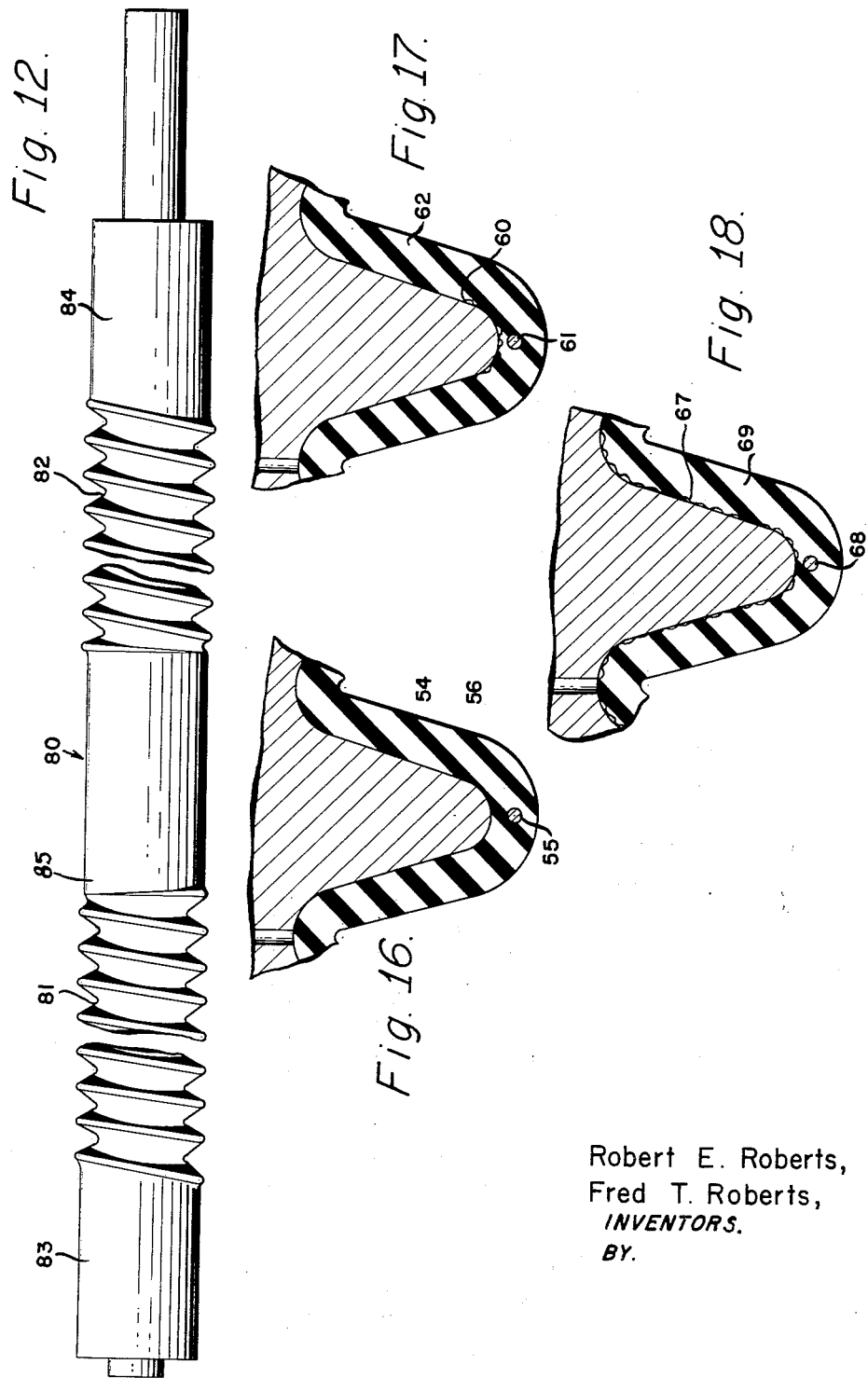

United States Patent Office 3,015,599
Patented Jan. 2, 1962

3,015,599
METHOD OF MAKING REINFORCED CORRUGATED HOSE
Fred T. Roberts and Robert E. Roberts, both of White Fences, Danbury Road, Wilton, Conn.
Filed Apr. 16, 1958, Ser. No. 728,985
6 Claims. (Cl. 156—144)

This invention relates to a method for the manufacture of reinforced, corrugated hose. It relates more particularly to the manufacture of reinforced, corrugated hose of elastomeric material having incorporated therein reinforcing members in the form of annular or helically spaced coils and with or without the provision of fabric as additional reinforcing means.

This invention is a continuation-in-part of application Serial No. 594,781, entitled "Method and Apparatus for Making Reinforced Hose," filed June 29, 1956.

In accordance with the invention described in the aforementioned copending application, a novel corrugated mandrel having means thereon for accurately locating the reinforcement means is utilized in practicing the method described. The mandrel of the aforesaid application is of a length which will form a single or a plurality of hose units and is provided with smooth cylindrical portions which are adapted to form the connecter end portions for the hose, while the surface of the mandrel between the cylindrical portions is formed with a plurality of annular or helical corrugations. The corrugations are provided with reinforcement positioning means in the form of flattened areas at the crests of the corrugations, shallow recesses or grooves also at the crests of the corrugations, or ridges or flanges formed at such crests. Such means serve to properly locate and position the turns or coils of the reinforcement. The reinforcement means can be in the form of spaced convolutions of a helical spring, or annular coils having their ends unattached but in overlapped relation to provide for limited expansion to enable the hose to be removed from the mandrel. The reinforcement means can be bare or can be covered with an elastomeric material and can be positioned directly on the seats of the mandrel. The mandrel is provided with a bore, and passages extending therefrom to the troughs of the corrugations so that when the material forming the body of the hose is applied over the mandrel and suction applied to the bore, the material will be drawn down into engagement with the surface of the mandrel and the reinforcement, and then molded on the mandrel in a steam vulcanizer, or in a mold, as required. After the hose has been molded, fluid pressure is applied to the bore in the mandrel to expand the hose so that it can be removed.

In accordance with applicants' copending application Serial No. 710,773, entitled "Method for the manufacture of Reinforced Hose," filed January 23, 1958, which is also a continuation-in-part of aforementioned application Serial No. 594,781, hose of the type described therein is made by utilizing a corrugated mandrel in which the flattened areas, recesses or ridges have been eliminated or supplemented by the provision of an elastomeric layer positioned over the crests of the corrugations or over the seating means provided, such elastomeric layer serving as resilient retaining means adapted to retain the convolutions of the reinforcements in position without the necessary utilization of auxiliary means, as described in the parent application. A hose assembly of the type described is then introduced into a mold and provided with a molded surface exterior by the application of pressure internally of the assembly.

In accordance with the present invention, a method similar to that described in copending application Serial No. 710,773 is utilized, one important difference being that the vulcanization or curing of the hose is carried out while the assembly is drawn against the surface of the mandrel and without the use of molds. At the same time, the utilization of seating means formed in the crests of the corrugations of the mandrel itself can be eliminated.

Other features and advantages of the invention will be apparent from the specification and claims when considered in connection with the accompanying drawings, in which:

FIGURE 1 is a view partly in elevation and partly in longitudinal cross section illustrating a mandrel utilized in the invention.

FIG. 2 is a view partly in elevation and partly in cross section showing the mandrel of FIG. 1 with reinforcing means positioned at the crests of the corrugations thereof.

FIG. 3 is a view partly in cross section and partly in elevation illustrating the assembly of FIG. 2 positioned within a vacuum chamber, preparatory to the application of a tubular layer thereto.

FIG. 4 is a view partly in elevation and partly in cross section illustrating the assembly of FIG. 3 after the application of the tubular layer.

FIG. 5 is an enlarged cross sectional view illustrating the structure of the assembly of FIG. 4 after the reinforcement has become embedded in the tubular layer during vulcanization.

Figure 6:
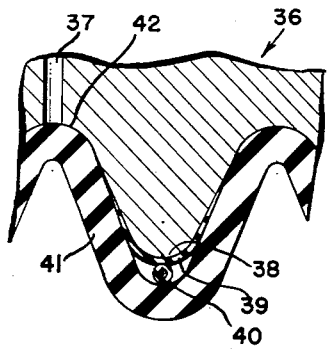

FIGS. 6 to 10, inclusive, illustrate enlarged cross sectional views illustrating the structure of modified forms of the invention as they are assembled on the mandrel prior to vulcanization.

FIG. 11 illustrates in longitudinal cross section a view of a mandrel having the assembly of the invention in position thereon prior to vulcanization.

FIG. 12 is a longitudinal view partly in cross section illustrating a full-length mandrel of the invention designed to produce two individual hose lengths at one time.

FIGS. 13 to 18, inclusive, illustrate enlarged cross sectional views of a portion of the wall structure of hose products manufactured in accordance with the forms of the invention illustrated in FIGS. 1 to 10, inclusive.

As shown in FIGS. 1 to 4, inclusive, a corrugated mandrel 20, which is preferably formed of metal such as steel or aluminum, is provided with corrugated areas 21 and 22 formed with respective crests 23 and 24 and corresponding valleys or grooves 25 and 26. An intermediate noncorrugated area 27 is provided which will conform to the sleeves or ends of the hose. Similar areas are formed at the ends of the mandrel. The mandrel is provided with an internal bore 28 from which radial channels 29 communicate with the surface of the mandrel at a number of points thereon in communication with the valleys formed in the surface of the mandrel. As shown in FIG. 2, a helical reinforcing member, which is formed of wire 30 coated with a layer of elastomeric or resilient material 31, is positioned over the crests of the corrugations. The presence of the resilient material over the wire permits these reinforcing members to be positioned at the crests of the corrugations, provided that the reinforcement is applied under a certain degree of stress so that the compression of the resilient material as well as its frictional resistance will permit the reinforcement to retain its position over the crests of the corrugations. Of course, the crests themselves should at least be gradually rounded rather than having a sharp peak, in order to facilitate the retention of the reinforcement. The ends of the reinforcing member are preferably formed doubled, as shown at 32, and may be taped to the mandrel by means of fabric or rubber coated tape 32a (FIG. 3), or a rubber or gum strip may also be used to hold the ends in place. As illustrated in FIG. 3, the assembly of the mandrel and the reinforcement is then introduced into a chamber 33 having a somewhat greater diameter than the diameter of the mandrel. This chamber is provided with an outlet 34 which communicates with a source of vacuum. Prior to the insertion of the mandrel assembly, a tubular layer 35 formed of an uncured or partially uncured elastomeric material, such a natural or synthetic rubber, or an elastomeric plastic material, such as polyvinyl chloride, is introduced into the chamber and drawn against the interior surface thereof by the application of vacuum, at the same time causing said tubular layer to become stretched to a certain degree. Previously, the tube has been formed or extruded to a diameter corresponding to the desired diameter of the hose and one which will firmly embrace the mandrel in its normal condition. After the mandrel with the reinforcing layer has been positioned within the chamber and within the tube drawn against the surface thereof, the vacuum is released and the tube allowed to relax to its normal diameter, at which point it shrinks down against the surface of the mandrel and around the reinforcement in the manner illustrated in FIG. 4. At this time, a partial vacuum or suction is applied to the bore 28 of the mandrel and this is communicated to radial openings 29 to the surface of the tube, thereby firmly drawing it against the mandrel and holding it in that position as long as the vacuum is maintained. If desired, an additional layer of uncured or at least partially uncured elastomeric material, as shown at 35a (FIG. 4), may be wrapped around the sleeve area of the mandrel to provide additional thickness at this point. However, this may be omitted in many cases. At this point, the mandrel is introduced into a heater or vulcanizer and subjected to vulcanization or curing, preferably at a temperature in the range of 250 to 350 degrees for a suitable period of time, usually in the range of 15 minutes to one hour, while maintaining the vacuum, to effect curing of the tubular material. The presence of vacuum internally of the mandrel results in a differential pressure being created, which, under the influence of the elevated temperatures, causes the material of the tubular layer to flow around and embed and become bonded with the surface coating around the reinforcement. The structure of the product produced in this manner is illustrated in FIG. 5 in which the coating 31 around the reinforcement is indicated separately although, in fact, during the vulcanization this coating becomes unified and integral with the tubular material. While the above description has related to the use of a helical reinforcement, similar results may be applied by the utilization of annular reinforcing members, particularly where these are formed with open but overlapping ends and are of a somewhat expansible nature, as described in the aforementioned parent application. In this case the corrugations on the mandrel are annular rather than helical.

A variation of the invention is illustrated in FIG. 6 in which, prior to the application of the reinforcing member 39 to the crests of the corrugations 38 formed in mandrel 36, a strip of elastomeric material 39 has been positioned over the crests of the corrugations. This permits the reinforcing member 40 to be applied to the crests of the corrugations, since the elastomeric material underlying it serves to cushion and retain this reinforcement, provided it is applied with a certain degree of tension so as to slightly depress or compress the elastomeric material which is of an inherently yieldable nature. Thereupon, the tubular elastomeric layer 41 is applied over the surface of the mandrel and the reinforcement in the manner described above through the use of a vacuum chamber and by the application of suction to the bore of the mandrel through radial openings 37. This results in drawing the tube down against the crests of the corrugations and into the valleys thereof 42, as shown. The assembly is then introduced into a heater and the suction is continued with the result that elements 39, 40 and 41 become intimately united, as described further below. Although the reinforcing member is illustrated as coated with a layer of elastomeric material, this may be omitted and bare wire used since it becomes surrounded and embedded during the cure.

Figure 7:
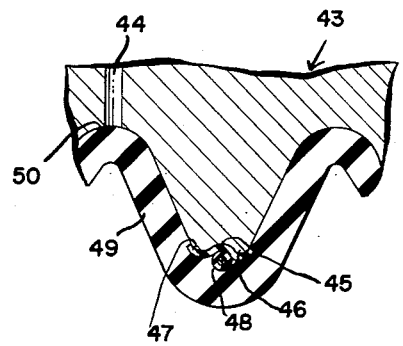

In a modified form of the invention illustrated in FIG. 7, mandrel 43 provided with radial bores 44 communicating with the valleys of the corrugations 50 is provided with crests of corrugations 45 formed with shallow recesses 46. These recesses are then overlaid with a layer of elastomeric material, which may be in the form of a strip of elastomeric tape 47 or the like. Reinforcement 48 is then positioned over the crests in the manner described above and elastomeric layer 49 drawn thereover by the application of suction in the manner described. This assembly may then be introduced into the heater in the same manner as described in connection with FIGS. 1 to 6, and the elements united by vulcanization or curing under the influence of heat and differential pressure. Here, too, the reinforcement may be bare instead of precoated.

Figure 8:
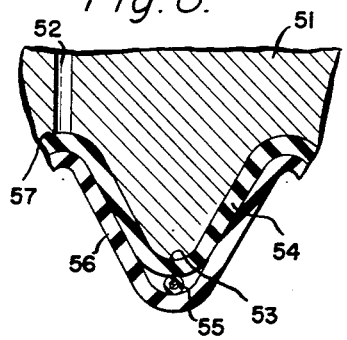

In the alternative form of the invention illustrated in FIG. 8, mandrel 51 is provided with radial openings 52. A first tubular elastomeric layer 54 is then positioned over the mandrel by placing it within a vacuum chamber of the type described in FIG. 3. A reinforcement 55, which may be coated or bare, is then positioned over the crests of the corrugations and over the resilient elastomeric material which serves to retain it in position due to its resilient yieldable nature. Thereupon, a second tubular layer 56 is applied by introducing the assembly into a vacuum chamber with the result that the second tubular layer is shrunk down over the first and around the reinforcement. Prior to the application of the second tubular layer, a layer of rubber cement or other adhesive material is applied over the surface of the first tubular layer so that when the second tubular layer is forced down thereon, the two layers become bonded to each other. Thereafter, when suction is applied to the radial openings 52, the two layers are drawn together against the surface of the mandrel and become united when the mandrel is introduced into a heater to effect vulcanization or curing while retaining this suction.

Figure 9:
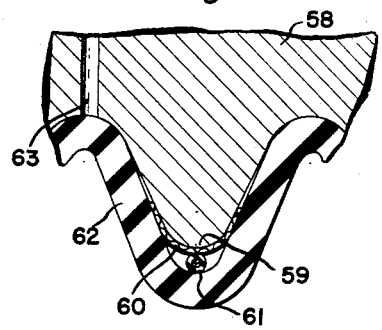

In the form of the invention illustrated in FIG. 9, mandrel 58 formed with corrugations having crests 59 and openings 63 communicating with the valleys of the mandrel, is provided with a strip of fabric 60 positioned over the crests of the corrugations, as shown. This fabric may be coated or impregnated with elastomeric material, or not, as the case may be, and may be preferably in the form of a tape which is wrapped around the crests only of the corrugations. Over the taped crests, reinforcement 61 may be drawn and held in position by the resilient yieldable nature of the fabric. The reinforcement may be bare wire or may have been previously coated with elastomeric material, in which case an additional degree of retention is provided by the compressibility of the resilient coating on the wire.

Tubular layer 62 is then drawn over the surface of the mandrel in the manner described above, after which the mandrel is introduced into the heater while suction is retained in order to effect the union of the elements of the hose.

Figure 10:
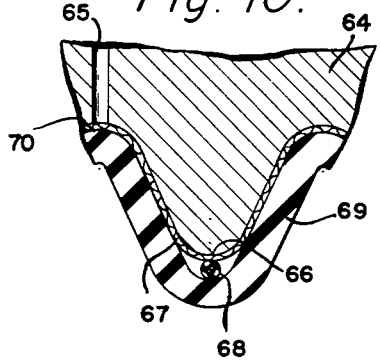

In the form of the invention illustrated in FIG. 10, mandrel 64 is provided with radial openings 65 and is formed with crests 66 and valleys 70. A layer of fabric 67 is wrapped or stretched around the mandrel and thereafter reinforcing member 68 is applied over the crests and retained in position by the resilient nature of the fabric. The reinforcement may also be provided with a coating of elastomeric material to facilitate bonding and positioning of the reinforcement.

Tubular layer 69 is then positioned over the assembly by using a vacuum chamber, as illustrated in FIG. 4, and the assembly is vulcanized to effect the union of the fabric, wire and tube in a unitary manner while retaining the suction in the manner described above.

FIG. 11 illustrates the overall assembly of the reinforcement and tube on the mandrel prior to vulcanization, and shows mandrel 71, provided with bore 72 and radial openings 73, the bore being provided with a connecting fitting 74 which communicates with a source of vacuum, such as a vacuum pump. Reinforcement 78 coated with a layer of elastomeric material 79 is positioned over the crests of the corrugations, as shown, and tubular layer 75 drawn thereover. The uncorrugated areas of the mandrel may be provided with a layer 76 of elastomeric material to provide additional thickening at what is to be the end portion, or collar, of the final product. The assembly is taped down tightly against the mandrel by means of tape, such as 77, applied at each end. The assembly is then introduced into a heater and vacuum applied thereto in the manner described above.

FIG. 12 illustrates a view showing the structure of a mandrel designed to form a plurality of lengths of hose in which mandrel 80 is formed with separate spaced corrugated sections 81 and 82, and is provided with uncorrugated end portions 83 and 84 and an uncorrugated intermediate area 85 which corresponds to the two end portions of the hose to be formed by cutting at an intermediate point. The mandrel is provided with an internal bore and radial passages for the application of suction to the assembled hose elements when these are applied to the mandrel in the manner described above.

FIGS. 14 to 18, inclusive, illustrate the structure of a corrugated hose produced in accordance with the present invention. FIG. 14 illustrates the structure of the type of hose formed by the method described in accordance with FIGS. 1 to 5 in which elastomeric tubular layer 41 has embedded therein reinforcing member 40, the coating of which has become integrally united and blended with the material of the tube.

In FIG. 13, the tubular layer is shown at 35 and the reinforcement 30 is embedded therein. The rubber tape applied over the crests of the corrugations in FIG. 6 has become bonded to and integrally united as a part of tubular layer 35.

In the form of the invention illustrated in FIG. 15, which corresponds to the hose construction illustrated in FIG. 7, reinforcement 48 is embedded within tubular layer 49, the rubber tape which was utilized to assist the positioning of the reinforcement having become a part of said layer.

In the form of the invention illustrated in FIG. 16, the resulting hose construction is that which is produced in accordance with the method illustrated in FIG. 8 in which layers 54 and 56 have become integrally united, embedding reinforcing member 55 therebetween.

As shown in FIG. 17, the structure of the hose produced in accordance with the method illustrated in FIG. 9 is shown in which fabric strip or tape 60 is embedded in and bonded to elastomeric layer 62, with reinforcing member 61 also embedded between the rubber and fabric.

As shown in FIG. 18, the structure of the hose produced in accordance with the method illustrated in FIG. 10 is described in which fabric layer 67 is embedded within and bonded to elastomeric layer 69, with reinforcement 68 shown embedded within the said layer between the fabric and the elastomeric material.

Having thus described our invention, what we desire to obtain in Letters Patent is set forth in the appended claims.

We claim:

1. The method of making a reinforced corrugated hose which comprises positioning a layer of yieldable material over the crests of the corrugations of a mandrel having a rigid corrugated molding surface, positioning reinforcing wires forming reinforcements around said yieldable material over said crests so that said reinforcements are engaged and retained in position thereby, positioning over said reinforcements and over said mandrel a tubular layer of at least partially uncured elastomeric material, introducing said mandrel with said tubular layer and reinforcements into a heating zone while forcing the elastomeric layer into surface contact with the mandrel and the reinforcements and thereby causing said reinforcements to become embedded within said elastomeric material while at the same time causing said material to conform to the corrugations of the mandrel, and removing from said mandrel the resulting corrugated hose product.

2. The method of making a reinforced corrugated hose which comprises positioning a layer of yieldable material over the crests of the corrugations of a mandrel having a rigid corrugated molding surface, positioning reinforcing means forming reinforcements around said yieldable material and over said crests so that said reinforcements are engaged and retained in position thereby, positioning over said reinforcements and over said mandrel a tubular layer of at least partially uncured elastomeric material, said mandrel having a hollow bore and having passages extending therefrom to the corrugated surface thereof, subjecting the resulting assembly to heat to effect curing of the elastomeric material while at the same time creating a differential pressure around the mandrel to force the layer of elastomeric material into surface contact therewith and with said reinforcing means, continuing the application of heat and differential pressure until curing of the elastomeric material is effected, and thereafter removing the finished hose from the mandrel.

3. The method of making a reinforced corrugated hose which comprises positioning a first layer of at least partially uncured elastomeric material over the crests of the corrugations of a mandrel having a rigid corrugated molding surface, positioning reinforcing means forming reinforcements around said layer of partially uncured elastomeric material and over said crests so that said reinforcements are engaged and retained in position thereby, positioning over said reinforcements and over said mandrel a tubular layer of at least partially uncured elastomeric material, said mandrel having a hollow bore and having passages extending therefrom to the corrugated surface thereof, subjecting the resulting assembly to heat to effect curing of the elastomeric material while at the same time creating a differential pressure around the mandrel to force the tubular layer of elastomeric material into surface contact therewith and with said reinforcing means, continuing the application of heat and differential pressure until curing of the elastomeric material is effected, and thereafter removing the finished hose from the mandrel.

4. The method of making a reinforced corrugated hose which comprises positioning a layer of yieldable material over the crests of the corrugations of a mandrel having a rigid corrugated molding surface, positioning a helical coil forming reinforcements around said yieldable material and over said crests so that said coil depresses the layer and is retained in position thereby, positioning over said reinforcements and over said mandrel a tubular layer of at least partially uncured elastomeric material, said mandrel having a hollow bore and having passages extending therefrom to the corrugated surface thereof, subjecting the resulting assembly to heat to effect curing of the elastomeric material while at the same time creating a differential pressure around the mandrel to force the layer of elastomeric material into surface contact therewith and with said reinforcing means, continuing the application of heat and differential pressure until curing of the elastomeric material is effected, and thereafter removing the finished hose from the mandrel.

5. The method of making a reinforced corrugated hose which comprises winding a strip of yieldable material over the crests of the corrugations of a mandrel having a rigid corrugated molding surface to form a layer thereover, positioning reinforcing means forming reinforcements around said yieldable material and over said crests so that said reinforcements are engaged and retained in position thereby, positioning over said reinforcements and over said mandrel a tubular layer of at least partially uncured elastomeric material, said mandrel having a hollow bore and having passages extending therefrom to the corrugated surface thereof, subjecting the resulting assembly to heat to effect curing of the elastomeric material while at the same time creating a differential pressure around the mandrel to force the layer of elastomeric material into surface contact therewith and with said reinforcing means, continuing the application of heat and differential pressure until curing of the elastomeric material is effected, and thereafter removing the finished hose from the mandrel.

6. The method of making a reinforced corrugated hose which comprises positioning a reinforcement comprising a helical wire covered with a layer of elastomeric material over the crests of the corrugations of a mandrel having a rigid corrugated molding surface so that said reinforcement is engaged by the crests and retained in position thereby, positioning over said reinforcement and over said mandrel a tubular layer of at least partially uncured elastomeric material, said mandrel having a hollow bore and having passages extending therefrom to the corrugated surface thereof, subjecting the resulting assembly to heat to effect curing of the elastomeric material while at the same time creating a differential pressure around the mandrel to force the layer of elastomeric material into surface contact therewith and with said reinforcement, continuing the application of heat and differential pressure until curing of the elastomeric material is effected, and thereafter removing the finished hose from the mandrel.

References Cited in the file of this patent

UNITED STATES PATENTS

| | | |
|---|---|---|
| 2,713,885 | McKinley | July 26, 1955 |
| 2,766,806 | Rothermel | Oct. 16, 1956 |
| 2,813,573 | Roberts | Nov. 19, 1957 |
| 2,837,121 | Roberts | June 3, 1958 |

FOREIGN PATENTS

| | | |
|---|---|---|
| 651,097 | Great Britain | Mar. 14, 1951 |